(12) United States Patent
Myers

(10) Patent No.: US 7,215,097 B2
(45) Date of Patent: May 8, 2007

(54) SERIES RESONANT CAPACITIVE DISCHARGE MOTOR

(75) Inventor: Keith Myers, Tucson, AZ (US)

(73) Assignee: Keith D. Myers, Tucson, AZ (US)

( * ) Notice: Subject to any disclaimer, the term of this patent is extended or adjusted under 35 U.S.C. 154(b) by 281 days.

(21) Appl. No.: 10/780,145

(22) Filed: Feb. 17, 2004

(65) Prior Publication Data
US 2005/0189927 A1 Sep. 1, 2005

(51) Int. Cl.
*H02J 7/00* (2006.01)
(52) U.S. Cl. ...................... 320/166; 320/167
(58) Field of Classification Search ........... 320/166, 320/167
See application file for complete search history.

(56) References Cited

U.S. PATENT DOCUMENTS

| | | | |
|---|---|---|---|
| 2,561,897 A * | 7/1951 | White | 307/108 |
| 3,890,548 A | 6/1975 | Gray | |
| 5,075,610 A * | 12/1991 | Harris | 318/701 |
| 5,852,358 A * | 12/1998 | Ehsani | 323/240 |
| 5,986,907 A * | 11/1999 | Limpaecher | 363/61 |
| 6,111,770 A * | 8/2000 | Peng | 363/131 |
| 6,384,564 B1 * | 5/2002 | Pollock | 318/701 |
| 6,664,750 B2 * | 12/2003 | Pelonis | 318/439 |
| 2001/0000293 A1 * | 4/2001 | Makaran | 318/254 |

OTHER PUBLICATIONS

Snell, J., "Capacitive Discharge Motor," printout from internet.

* cited by examiner

*Primary Examiner*—Adolf Deneke Berhane
*Assistant Examiner*—Richard V. Muralidar
(74) *Attorney, Agent, or Firm*—A Boegemann Law Firm, PLC; Les A. Boegemann

(57) ABSTRACT

Two capacitors and at least one inductor are used to create an alternating magnetic field for use in electric motors. Charge leaving one capacitor passes through the inductor, creating a magnetic field, and is captured by the second capacitor. Energy is added to the second capacitor which is then discharged through the inductor to the first capacitor, creating a magnetic field of opposite polarity as that created by the first discharge.

20 Claims, 3 Drawing Sheets

SERIES RESONANT CAPACITIVE DISCHARGE MOTOR

BACKGROUND OF THE INVENTION

1. Field of the Invention

This invention is related in general to the field of electric motors. In particular, the invention consists of a highly inductive electric motor driven by capacitor discharge.

2. Description of the Prior Art

In U.S. Pat. No. 3,890,548, Edwin V. Gray discloses a pulsed capacitor-discharge electric engine. Gray introduces the concept of charging capacitors and using the stored energy from the capacitors to drive an electric motor to develop considerable torque through the magnetic repulsion action of rotor and stator cores wound with coils. Capacitors are discharged synchronously through these cores utilizing a control mechanism to position discharge elements. Discharge overshoot or back e.m.f. from the collapsing magnetic field in the coils is used to charge external batteries for conservation of power.

Gray's rotary electric machine is believed to operate on the principle of conservation of energy. Once rotation occurs, electric current is needed only at the instant of a capacitor discharge in order to advance the rotor.

An important aspect of Gray's invention is that two banks of capacitors are utilized; one to energize the stator coil and one to energize the rotor coil. Additionally, all the electric charge discharged from the banks of capacitors must be collected and either dispersed as waste energy through resistors or collected and sent to the batteries. This requires that a large amount of current pass through the discharge circuit. During the process of collecting this discharge energy, a large amount of the energy is lost. Additionally, the banks of capacitors must be fully recharged before the next discharge cycle. One additional aspect of Gray's invention is that a special motor must be designed and built to take advantage of his concept. Accordingly, it would be advantageous to have a circuit, similar to that disclosed by Gray, with the capacity to reuse a significant portion of the charge without requiring that it be sent back to the battery. Additionally, it would be advantageous to have a capacitor motor-driver circuit that energizes only the stator coil, rather than both the stator and the rotor. It would also be advantageous to have a capacitor-discharge motor circuit that works with electric motor designs that are common in the industry.

J. Snell has previously disclosed a variation of the Gray capacitive discharge, as illustrated in FIG. 1. Four motor coils are represented by the inductive circuit elements T1, T2, T3, and T4. Four capacitors, C1–C4 (respectively) are utilized to drive the four motor coils. Four switches and numerous diodes are utilized to establish the timing necessary to ensure the motor continues to rotate.

Initially, a charge is placed on C1. Switches are aligned to allow C1 to discharge through T1 and place a portion of its original charge on C3. A counter electromotive force is passed to C2. Additional switches are closed, allowing C3 to discharge through T3. This secondary discharge, while smaller than the original discharge through T1, provides some additional torque. In this manner, the residual energy captured by C3 is used to provide power to the motor. However, no provision is made to bring the charge of capacitor C3 to the level initially obtained by C1. Therefore, the amount of torque which may be supplied to the motor is significantly less during the secondary discharge than that available during the primary discharge. As with the Gray motor, Snell's invention requires that a special motor be designed and built to take advantage of his circuit, i.e., a motor having at least four coils that are electrically separate from each other. It would be advantageous to design a motor driver circuit that can take advantage of electric motors common in the industry. Additionally, it would be desirable to have a capacitor discharge motor driver circuit that provides a consistent level of torque during each discharge cycle.

SUMMARY OF THE INVENTION

The invention disclosed herein utilizes two capacitors to drive a single motor phase winding or coil. During the first half of a cycle, a charging circuit charges the first capacitor to a voltage level set by a switch control circuit. The control circuit and mechanical or solid-state switching devices are utilized to discharge this capacitor through a motor coil when the rotor is at an appropriate angle with respect to the coil. Electric charge flows through the coil, forming a first magnetic field, and is collected on a second capacitor. The formed magnetic field creates an attractive force between a second magnetic field produced by a magnet or a member made of high magnetic permeable material that is mounted on the motor shaft.

The motor coil is energized by the discharging capacitor which creates a torque pulse on the motor shaft and causes the shaft to spin. In this way, energy is transferred from the first capacitor to the first magnetic field, and then to the shaft to provide mechanical energy. Energy not used by the motor is transferred to the second capacitor. The charge collected on the second capacitor is retained on the second capacitor by the switching devices and the rotor shaft continues to rotate freely.

Remaining residual charge is drained from the first capacitor and a portion of the charge is used by the charging circuit to assist in charging the second capacitor to the preset voltage level. The control circuit and switching devices are then used to discharge the second capacitor through the same coil to the first capacitor. The direction of current from the second discharge is such that the resulting magnetic field has a polarity opposite to that created by discharging the first capacitor. When performed at the correct time, the second discharge is also used to produce an attractive force between the first magnetic field and the second magnetic field produced by a magnet or a member made of magnetic material mounted on the rotor shaft, thus providing additional torque that may be converted to mechanical energy by the shaft.

Once this second discharge has occurred, the residual charge remaining on the second capacitor is drained and a portion of the charge is used by the charging circuit to assist in charging the first capacitor and the cycle begins again.

An important aspect of this invention is the dual capacitor circuit used to energize a single coil, producing an alternating magnetic field. The coil is energized when the shaft is at an appropriate angle with respect to the coil. After the receiving capacitor has collected the energy from the discharge, it is charged to a predetermined voltage level by the charging circuit. In this way, the collected energy is available for immediate reuse by the device and the charging circuit needs only to replace the energy consumed during the discharge in order to maintain shaft rotation. Additionally, the energy available for conversion to mechanical energy is consistent during each discharge cycle.

Another advantage of this invention is that it can be implemented using brushless direct-current permanent-magnet motors and switched-reluctance motors common in the industry. In particular, the phase winding, or phase, of a single-phase switched-reluctance motor is connected between the two capacitors. On a polyphase switched reluctance motor, each phase and the switching devices are connected between two capacitors. The two capacitors for each phase and the switching devices are separate from the capacitors connected to the other phases and switching devices. The phase(s) of a permanent-magnet motor is energized in the same way as for the switched reluctance motor except that the control circuit must charge and discharge the appropriate capacitor in order for the magnetic field of the phase to attract the magnetic field of the magnet.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED EMBODIMENTS

This invention is based on the idea of utilizing a pair of capacitors connected in series with an inductive electric-motor coil, a voltage source, diodes, and one or more switching devices. The arrangement of these elements creates an alternating flow of electric current through the coil, wherein the timing of the electric current alternation is controlled by the switching devices. Electric charge from a discharge capacitor passes through the motor coil and is collected by a receiving capacitor. The receiving capacitor is then charged by the voltage source to replace any energy consumed in the first discharge. The switching device alternates the flow of electric current, which is discharged back through the motor coil. By capturing charge which has already passed through the motor, this arrangement reduces the amount of electrical energy needed to drive the motor.

Figure 1:
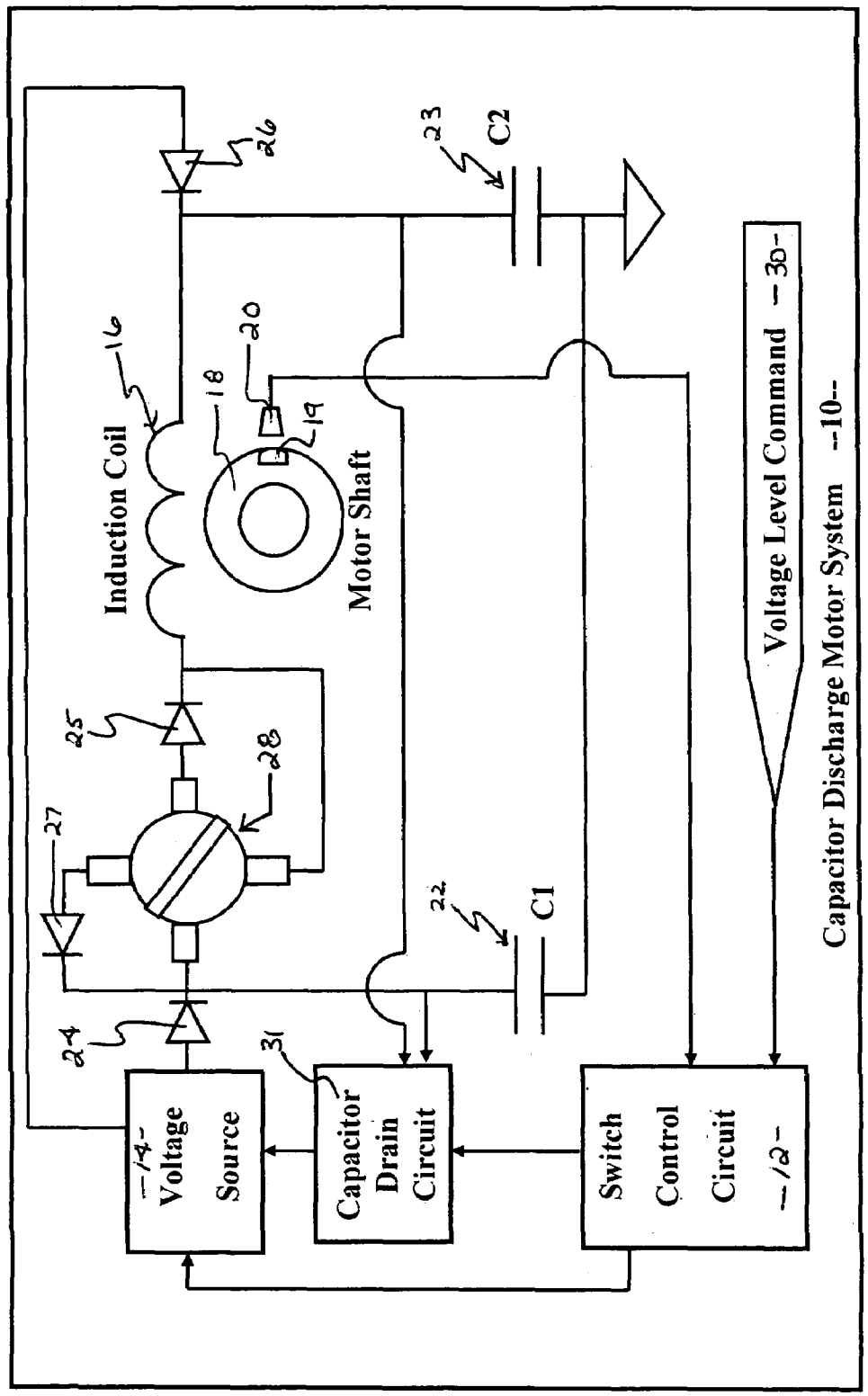
FIG. 1 is a schematic of a dual capacitor/single-inductive-coil capacitor discharge electric motor system in accordance with the invention, wherein the alternating switching of capacitor discharges is mechanically controlled utilizing gears and commutated brushes.

Referring to the figures, FIG. 1 is a schematic illustration of a capacitor-discharge electric-motor system 10 that includes a switch control circuit 12, a voltage source 14, a motor coil 16 (represented as an inductor), a rotating shaft 18 on which magnetic material 19 is mounted, a shaft position sensor 20, a first capacitor 22, and a second capacitor 23. In this embodiment of the invention, diodes 24, 25, 26, and 27 are used in conjunction with a geared switch 28 to control the timing of capacitor discharges.

The switch control circuit 12 accepts input from a voltage-level-command line 30 and the shaft-position sensor 20 to control the operation of the voltage source 14. It is important that the operation of the voltage source 14 be properly controlled by the switch control circuit 12 to ensure proper timing for charging the capacitors 22,23. A capacitor drain circuit 31 is directed to remove residual charge from the capacitors 22,23 at the appropriate time. The drained residual charge is returned to the voltage source 14 where it is converted to a higher voltage level for re-use in charging of the capacitors.

Every two rotations of the shaft 18 is referred to as a cycle and requires two similar, but opposing, events. The first half of a cycle includes draining residual electric charge from the second capacitor 23 and returning it to the voltage source 14. Simultaneously, the voltage source 14 charges the first capacitor 22 through the first charging diode 24. This simultaneous charging of the first capacitor 22 and draining of the second capacitor 23 maximizes the electric potential between the capacitors.

The switch 28 is mechanically connected to a gear on the rotating shaft 18. In this embodiment of the invention, the ratio of the motor-shaft gear to the switch gear is 4 to 1, i.e., for every rotation of the shaft 18, the geared switch 28 advances 90 degrees. Once the first capacitor 22 is fully charged, the geared switch 28 advances so that a conducting path exists from the first capacitor 22, through the first discharge diode 25, and through the motor coil 16, to the second capacitor 23.

The motor coil 16 is constructed in such a way as to be a highly inductive electrical element. Electricity flowing through this coil creates a magnetic field that stores the energy discharged by the first capacitor. The magnetic field created by the motor coil 16 attracts the magnetic material 19 on the shaft 18, resulting in a torque pulse on the shaft 18 for the duration of the discharge. The mechanical energy imparted to the shaft 18 can be harnessed by devices attached to it. However, a measure of mechanical energy is retained by the shaft 18 so that it can continue to rotate.

Initially, the electric potential of the energy stored on the first capacitor 22 is higher than that of the second capacitor 23 (the second capacitor having been drained to a minimum voltage). When the first capacitor 22 begins discharging through the induction coil 16, its stored electric energy is used to create the magnetic field. In this manner, energy is transferred from the first capacitor to the magnetic field of the coil. Mechanical loads attached to the shaft 18 absorb some of the energy stored in this magnetic field. Energy not utilized by the mechanical load is transferred to the second capacitor 23 as the magnetic field collapses. The result is that the electric potential of the energy stored on the second capacitor 23 is now higher than that remaining on the first capacitor 22. The first discharge diode 25 and the current position of the geared switch 28 prevents the second capacitor 23 from discharging back through the electrical path to the first capacitor 22. As the shaft 18 continues rotating, the geared switch 28 advances so as to break the electrical path initially used to discharge the first capacitor to the second capacitor.

During the second half of a cycle, any residual charge left on the first capacitor 22 is drained by the capacitor drain circuit 31. Simultaneously, the voltage source 14 charges the second capacitor 23 through the second charging diode 26. In this manner, the electric potential between the two capacitors is maximized. The second capacitor is charged to a level dictated by the voltage level command 30 while the geared switch 28 continues to advance. When the geared switch 28 advances sufficiently, it creates an electrical path for discharging the second capacitor 23, through the coil 16 and the second discharge diode 27, to the first capacitor 22.

The second discharge diode 27 prevents the first capacitor 22 from discharging back through the established electrical path to the second capacitor 23. The switch control circuit 12 directs the capacitor drain circuit 31 to drain the residual charge from the second capacitor 23 while the voltage source 14 charges the first capacitor 22. The first capacitor 22 is charged to a level dictated by the voltage-level-command line 30 while the geared switch 28 continues to advance. When the geared switch 28 advances sufficiently, the first capacitor 22 is once again discharged.

In this manner, the process of discharging the first capacitor 22 is repeated. However, the voltage source 14 need only replace the energy consumed during each discharge cycle. This process reduces the amount of energy required to maintain rotation of the shaft 18 and provide torque which is utilized by mechanical loads attached to the shaft 18.

Assuming that the electric energy discharged between the two capacitors 22,23 is approximately equal in magnitude during each half of the process, the power available to any mechanical load will be relatively constant. One advantage of the present invention is that a single coil is utilized to provide energy to the shaft 18 twice during each rotation of the motor shaft 18.

Figure 2:
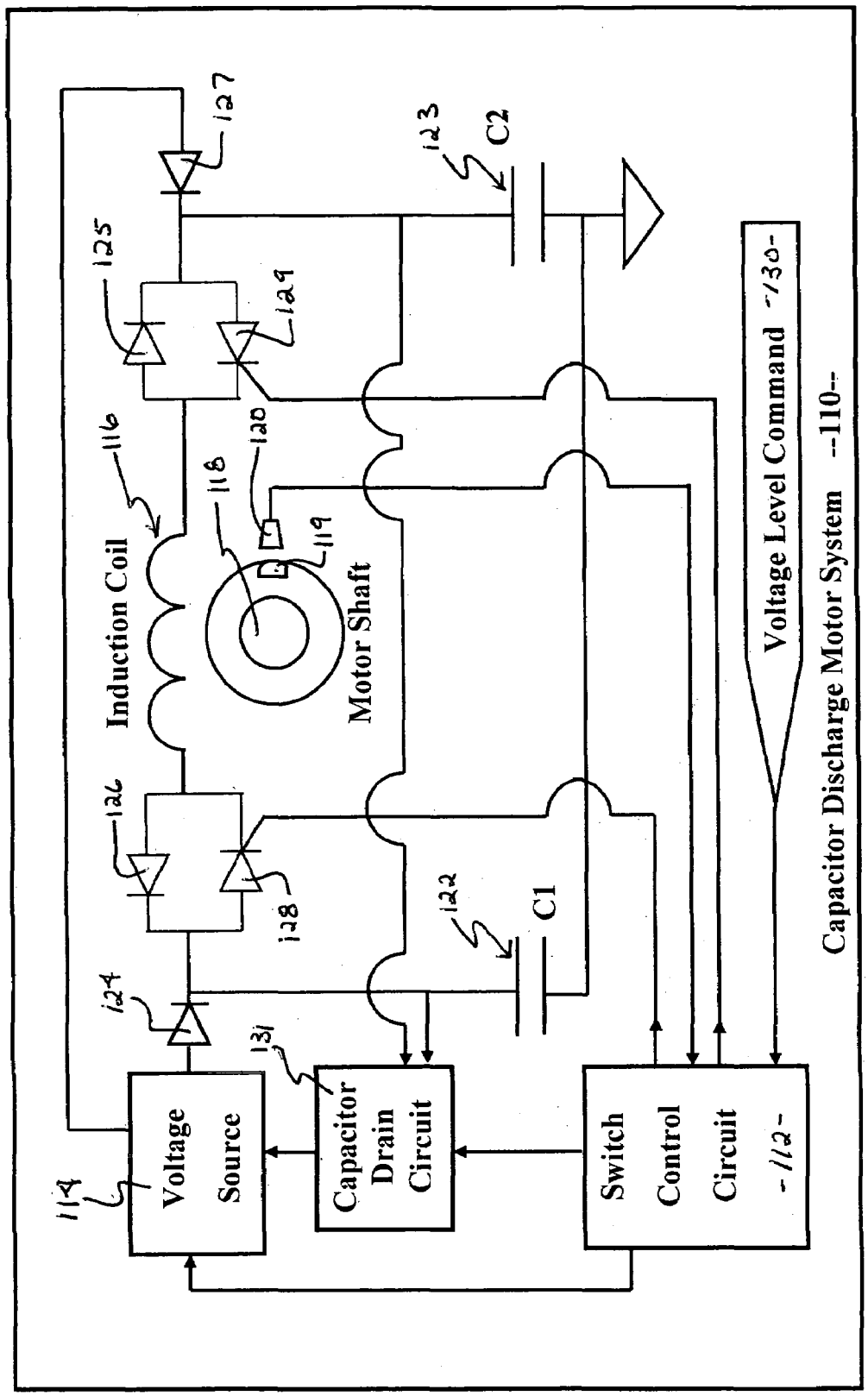
FIG. 2 is a schematic of a preferred embodiment of the invention utilizing silicon controlled rectifiers to control the alternating switching of the capacitor discharges.

In another embodiment of the invention, as illustrated in FIG. 2, the mechanically geared switch 28 present in the first embodiment 10 is replaced with silicon controlled rectifiers (SCRs) 128,129. The capacitor discharge electric motor system 110 includes a switch control circuit 112, a voltage source 114, an inductive motor coil 116, a motor shaft 118, magnetic material 119, a shaft position sensor 120, a capacitor drain circuit 131, a first capacitor 122, and a second capacitor 123. Charging diodes 124 and 127 are used in conjunction with SCRs 128,129 to control the alternating discharge of the capacitors 122,123.

The switch control circuit 112 accepts input from the voltage-level-command line 130 and the shaft-position sensor 120 to control the operation of the voltage source 114, the capacitor drain circuit 131, and the SCRs 128,129. The first half of the cycle corresponding to the rotation of the motor shaft 118 includes draining residual electric charge from the second capacitor 123 while charging the first capacitor 122 through the first charging diode 124.

Once the first capacitor 122 is charged to a level dictated by the voltage-level-command line 130, the switch control circuit 112 activates the first SCR 128 to create an electrical path from the first capacitor 122, through the first SCR 128, through the motor coil 116, and through the first discharge diode 125, to the second capacitor 123. During the second half of the cycle, the switch control circuit 112 directs the capacitor drain circuit to drain the residual charge from the first capacitor 122 while the voltage source 114 charges the second capacitor 123 through the second charging diode 127. Once the second capacitor is charged to a level directed by the voltage-level-command line 130, the switch control circuit 112 activates the second SCR 129 to create an electrical path for discharging the second capacitor 123, through the second SCR 129, through the coil 116, and through the second discharge diode 126, to the first capacitor 122.

Figure 3:
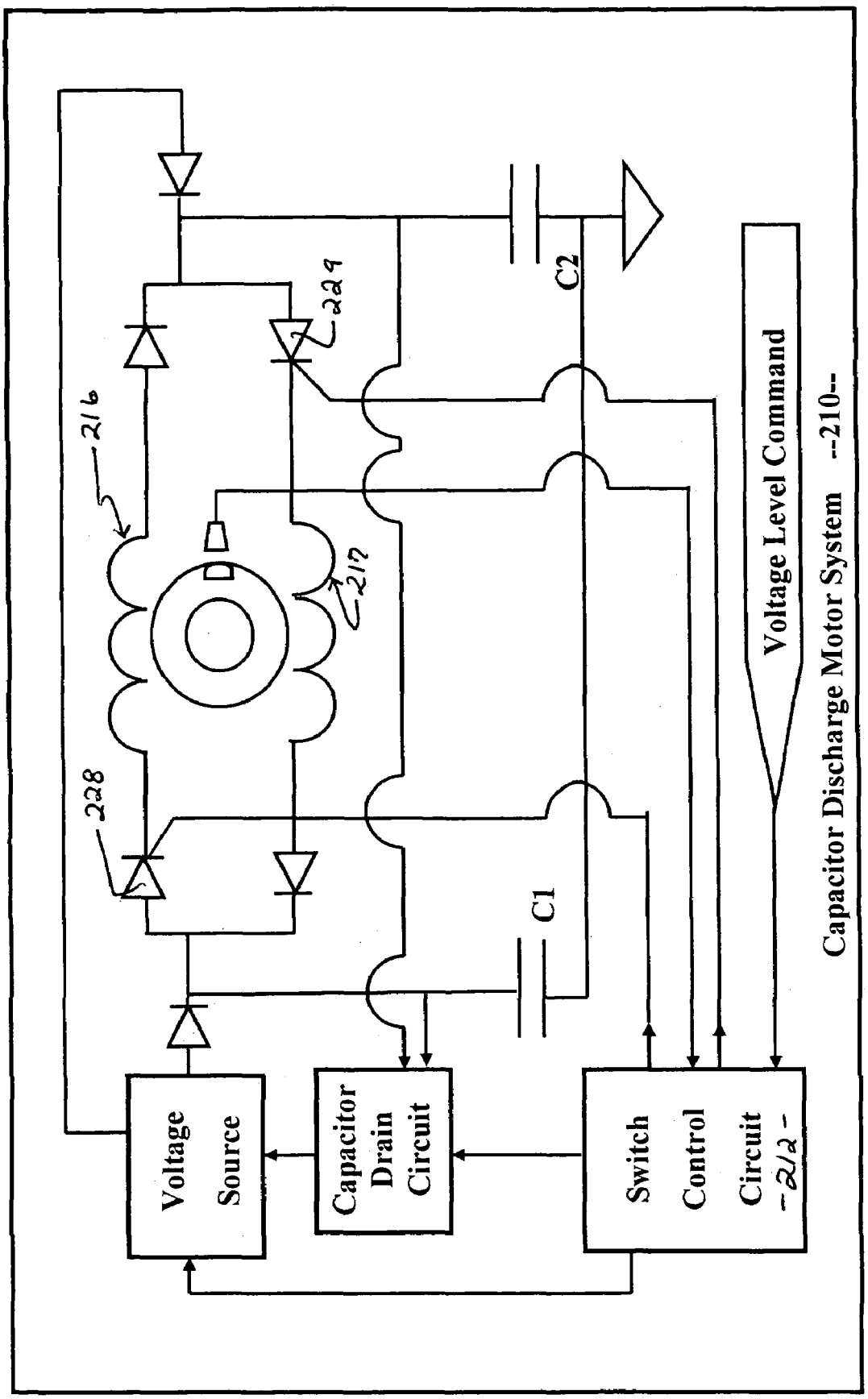
FIG. 3 is a schematic, according to the invention, utilizing multiple inductive coils and silicon controlled rectifiers to control the alternating switching of the capacitor discharges.

Another embodiment of the invention utilizes a plurality of inductive coils, as illustrated in FIG. 3. The capacitor discharge motor system 210 is similar to that of FIG. 2, but contains two inductive coils 216,217. Current discharges through the coils 216,217 are controlled by the switch control circuit 212 and the SCRs 228,229.

Those skilled in the art of making electric motors may develop other embodiments of the present invention. For example, an electric motor may contain multiple capacitor discharge coils similar to the one described herein and illustrated by FIG. 3. For example, three inductive coils may be utilized with three capacitors wherein the first inductive coil connects the first and second capacitors, the second inductive coil connects the second and third capacitors, and the third inductive coil connects the third and first capacitors.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

I claim:

1. A series resonant capacitor discharge system, comprising:
    an electric circuit loop comprising a plurality of electrical components, said plurality of electrical components comprising
        a first capacitor comprising a first terminal and a second terminal,
        a second capacitor likewise comprising a first terminal and a second terminal,
        a common node connecting the first terminal of the first capacitor to the first terminal of the second capacitor,
        a switching device, and
        a first inductor, wherein the switching device and the first inductor are connected in series between the second terminal of the first capacitor and the second terminal of the second capacitor; and
    a controlled voltage source comprising
        a first output connected to the second terminal of the first capacitor, and
        a second output connected to the second terminal of the second capacitor;
    wherein the controlled voltage source places a first voltage on said first output while disconnecting the second output from the second terminal of the second capacitor during a first charging cycle;
    wherein the switching device creates a first electrical path from said second terminal of said first capacitor to said second terminal of said second capacitor through said first inductor thereby creating a first flow of electric current during a first discharge cycle subsequent to said first charging cycle;
    wherein the controlled voltage source places a second voltage on said second output while concurrently disconnecting the first output from the second terminal of the first capacitor during a second charging cycle subsequent to said first discharge cycle; and
    wherein the switching device creates a second electrical path from said second terminal of said second capacitor to said second terminal of said first capacitor through said first inductor thereby creating a second flow of electric current during a second discharge cycle subsequent to said second charging cycle.

2. The series resonant capacitor discharge system of claim 1, further comprising a motor shaft;
    wherein the first flow of electric current produces a first magnetic field around said first inductor and said motor shaft interacts with said first magnetic field to produce a rotating motion of said motor shaft.

3. The series resonant capacitor discharge system of claim 2, wherein said first inductor comprises an electric motor phase winding.

4. The series resonant capacitor discharge system of claim 2, further comprising:

a capacitor drain circuit connected to the second terminal of the first capacitor and the second terminal of the second capacitor, wherein said capacitor drain circuit removes a first residual electric charge from said second terminal of said second capacitor during said first charging cycle and removes a second residual electric charge from said second terminal of said first capacitor during said second charging cycle.

5. The series resonant capacitor discharge system of claim 2, further comprising:
a shaft position sensor;
a switch control circuit; and
magnetic material mounted on said motor shaft; whereby said shaft position sensor detects movement of said magnetic material corresponding to said rotating motion of said motor shaft, said shaft position sensor transmits a signal to said switch control circuit, and said switch control circuit controls said controlled voltage source.

6. The series resonant capacitor discharge system of claim 4, further comprising:
a shaft position sensor;
a switch control circuit; and
magnetic material mounted on said motor shaft; whereby said shaft position sensor detects movement of said magnetic material corresponding to said rotating motion of said motor shaft, said shaft position sensor transmits a signal to said switch control circuit, and said switch control circuit controls said controlled voltage source and said capacitor drain circuit.

7. The series resonant capacitor discharge system of claim 2, wherein said switching device comprises a mechanical switch.

8. The series resonant capacitor discharge system of claim 7, wherein said motor shaft comprises a motor shaft gear, said mechanical switch comprises a switch gear, and said switch gear is driven by said motor shaft gear during said rotating motion to produce a rotating motion of said mechanical switch.

9. The series resonant capacitor discharge system of claim 5, wherein said switching device comprises a solid state switch.

10. The series resonant capacitor discharge system of claim 9, wherein said solid-state switching device comprises a solicon-controlled rectifier.

11. A series resonant capacitor discharge system, comprising:
an electric circuit loop comprising a plurality of electrical components, said plurality of electrical components comprising
a first capacitor comprising a first terminal and a second terminal,
a second capacitor likewise comprising a first terminal and a second terminal,
a common node connecting the first terminal of the first capacitor to the first terminal of the second capacitor,
a first switching device,
a second switching device,
a first inductor, wherein the first switching device and the first inductor are connected in series between the second terminal of the first capacitor and the second terminal of the second capacitor;
a second inductor, wherein the second switching device and the second inductor are connected in series between the second terminal of the first capacitor and the second terminal of the second capacitor; and a controlled voltage source comprising
a first output connected to the second terminal of the first capacitor, and
a second output connected to the second terminal of the second capacitor;
wherein the controlled voltage source places a first voltage on said first output while disconnecting the second output from the second terminal of the second capacitor during a first charging cycle;
wherein the first switching device creates a first electrical path from said second terminal of said first capacitor to said second terminal of said second capacitor through said first inductor thereby creating a first flow of electric current during a first discharge cycle subsequent to said first charging cycle;
wherein the controlled voltage source places a second voltage on said second output while concurrently disconnecting the first output from the second terminal of the first capacitor during a second charging cycle subsequent to said first discharge cycle; and
wherein the second switching device creates a second electrical path from said second terminal of said second capacitor to said second terminal of said first capacitor through said second inductor thereby creating a second flow of electric current during a second discharge cycle subsequent to said second charging cycle.

12. The series resonant capacitor discharge system of claim 11, further comprising a motor shaft;
wherein the first flow of electric current produces a first magnetic field around said first inductor and said motor shaft interacts with said first magnetic field to produce a rotating motion of said motor shaft.

13. The series resonant capacitor discharge system of claim 12, wherein said first inductor comprises an electric motor phase winding.

14. The series resonant capacitor discharge system of claim 12, further comprising:
a capacitor drain circuit connected to the second terminal of the first capacitor and the second terminal of the second capacitor, wherein said capacitor drain circuit removes a first residual electric charge from said second terminal of said second capacitor during said first charging cycle and removes a second residual electric charge from said second terminal of said first capacitor during said second charging cycle.

15. The series resonant capacitor discharge system of claim 12, further comprising:
a shaft position sensor;
a switch control circuit; and
magnetic material mounted on said motor shaft; whereby said shaft position sensor detects movement of said magnetic material corresponding to said rotating motion of said motor shaft, said shaft position sensor transmits a signal to said switch control circuit, and said switch control circuit controls said controlled voltage source.

16. The series resonant capacitor discharge system of claim 14, further comprising:
a shaft position sensor;
a switch control circuit; and
magnetic material mounted on said motor shaft; whereby said shaft position sensor detects movement of said magnetic material corresponding to said rotating motion of said motor shaft, said shaft position sensor transmits a signal to said switch control circuit, and said switch control circuit controls said controlled voltage source and said capacitor drain circuit.

17. The series resonant capacitor discharge system of claim 12, wherein said first switching device comprises a mechanical switch.

18. The series resonant capacitor discharge system of claim 17, wherein said motor shaft comprises a motor shaft gear, said mechanical switch comprises a switch gear, and said switch gear is driven by said motor shaft gear during said rotating motion to produce a rotating motion of said mechanical switch.

19. The series resonant capacitor discharge system of claim 18, wherein said first switching device comprises a solid state switch.

20. The series resonant capacitor discharge system of claim 19, wherein said solid-state switching device comprises a solicon-controlled rectifier.

* * * * *